United States Patent
Miyauchi et al.

[15] 3,655,259
[45] Apr. 11, 1972

[54] STEREOSCOPIC MICROSCOPE WITH GRADED INDEX FIBER OBJECTIVE LENSES

[72] Inventors: Tsuneshige Miyauchi, Amagasaki-shi; Jiro Hirano, Hyogo-ken; Atsufumi Ueki; Ryuji Tatsumi, both of Tokyo-to; Kunihiro Mukai, Mie-ken; Shogo Yoshikawa, Tokyo-to, all of Japan

[73] Assignee: Nippon Selfoc Kabushiki Kaisha (also known as Nippon Selfoc Co., Ltd.), Tokyo-to, Japan

[22] Filed: Aug. 22, 1969

[21] Appl. No.: 852,196

[30] Foreign Application Priority Data

Aug. 24, 1968 Japan..................................43/60587
Aug. 26, 1968 Japan..................................43/73377
Sept. 5, 1968 Japan..................................43/76464

[52] U.S. Cl.......................350/36, 350/96 R, 350/175 GN, 128/6
[51] Int. Cl.................................G02b 21/22, G02b 5/14
[58] Field of Search.............350/95, 96 WG, 36, 175 GN; 128/6

[56] References Cited

UNITED STATES PATENTS

| | | |
|---|---|---|
| 3,083,123 | 3/1963 | Navias.................350/175 GN UX |
| 3,320,114 | 5/1967 | Schulz...................................350/96 X |
| 3,434,774 | 3/1969 | Miller...................................350/96 WG |
| 3,520,587 | 7/1970 | Tasaki et al. ......................350/96 B X |
| 3,525,331 | 8/1970 | Mori.................................350/96 B X |

OTHER PUBLICATIONS

Miller Article in Bell System Technical Journal Vol. 44, No. 9. Nov. 1965 pp. 2017– 2030 cited.
Kawakami et al., Article in Proceedings of the IEEE Dec. 1965 pp. 2148 and 2149 cited.

Primary Examiner—David H. Rubin
Attorney—Robert E. Burns and Emmanuel J. Lobato

[57] ABSTRACT

The disclosure relates to an optical image transmitting apparatus adapted for a viewfinder for observation of any object, wherein two systems of transparent structures are provided whose refractive index distribution in each cross section perpendicular to the center axis is reduced nearly in proportion to a square of a distance from the center axis, said transparent structures consisting of rod-like or fibrous substance and being disposed so as to view any article stereoscopically; a viewfinder for medical observation wherein said transparent structures cable of transmitting an optical image therethrough and an optical fiber boundle for transmitting an illumination light to illuminate the article to be the observed are provided in a cavity portion of the inside of a hollow needle such as a hypodermic syringe; a microscope wherein said fibrous transparent structures are used as the object lens; and the like.

5 Claims, 12 Drawing Figures

FIG. 1 PRIOR ART
FIG. 2
FIG. 3
FIG. 4
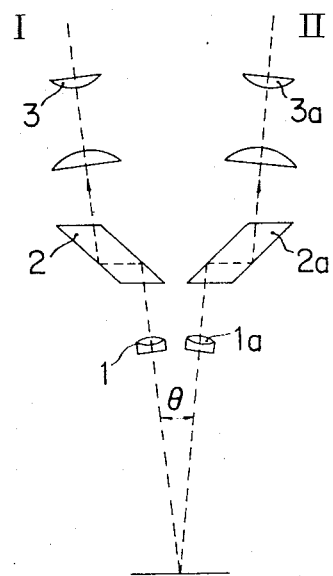
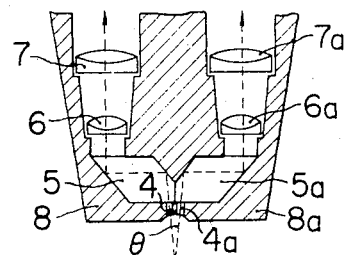
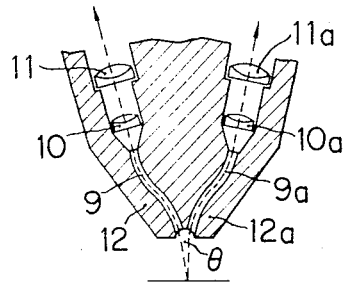
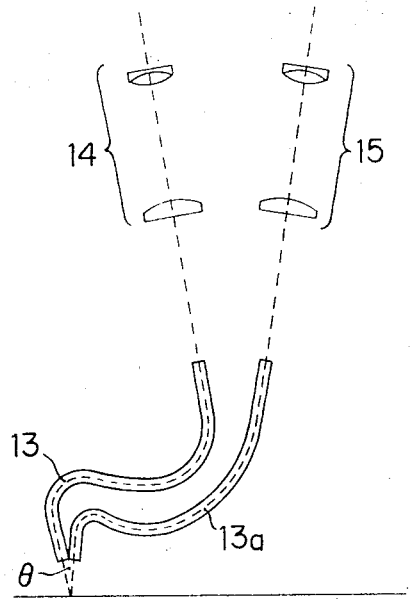

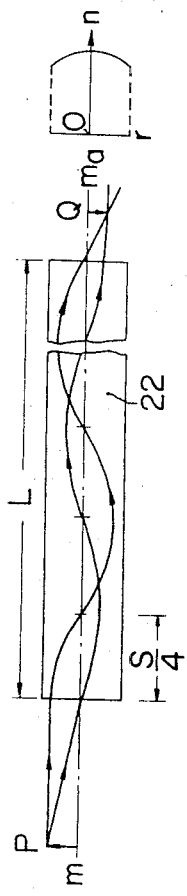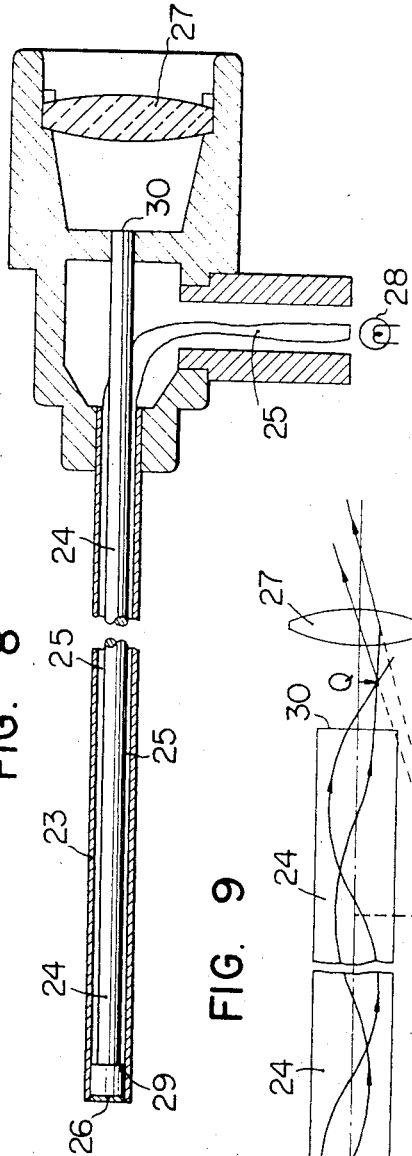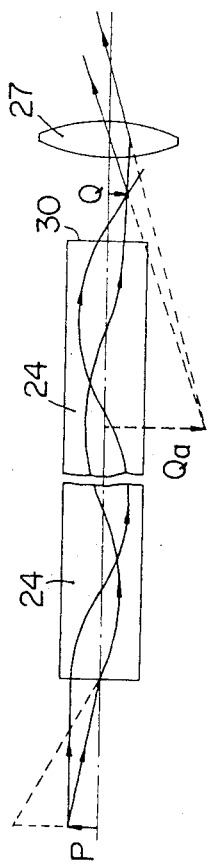
FIG. 7
FIG. 8
FIG. 9

STEREOSCOPIC MICROSCOPE WITH GRADED INDEX FIBER OBJECTIVE LENSES

BACKGROUND OF THE INVENTION

Hitherto, a stereoscopic microscope has been in use for observing an article stereoscopically with both eyes by using two independent optical systems as one set, but as shown in FIG. 1, the optical system of this stereoscopic microscope are composed of a monocular lens system I consisting of an object lens 1, a prism 2, and an ocular lens 3 and a monocular lens system II consisting of an object lens 1a, a prism 2a and an ocular lens 3a. An opening angle ($\theta$) formed by the optical axes of the lens system I and lens system II is ordinarily said to be an angle of approximately 12° considering a distance of clear vision and the interval between the two eyes of a man. Because of this angle, the stereoscopic microscope has a drawback that bodytubes of the object lenses of right and left interfere with each other when an article is observed by making the two object lenses approach simultaneously thereto, and it is impossible to make both bodytubes approach too closely to each other. Furthermore, since a spherical lens is normally employed as the object lens, and only one lens cannot be used, because the spherical aberration becomes too large particularly if the magnification is desired to be increased. Therefore, a combined lens is generally used, and the object lens becomes fairly large size as compared with the size of the object, and it is difficult to arrange two object lenses too close relative to each other. Because of the limit in the structure of the object lens, the object lens becomes necessarily a lens having a long focal distance and thus high magnification cannot be obtained by such lens.

On the other hand, for the object lens of the conventional microscope, a spherical lens is employed, and in case high magnification is desired, one lens is not suitable for use as the spherical aberration becomes too large. Under the circumstance, a combined lens is generally used, but the object lens becomes relatively large as compared with size of the object, and thus it is impossible to observe freely the inside of a small hole or surface having relatively high irregularities. Also, from the relation of the object lens and ocular lens, it has been almost impossible to move them freely according to the object, and in case the object is of large size, pretreatment was required to change the form of the object for easier observation of the object.

SUMMARY OF THE INVENTION

Therefore, an object of the present invention is to provide a microscope capable of stereoscopically observing an object with high magnification by utilizing the lens body having an extra small diameter and a short focal distance and composed of a transparent structure whose refractive index is reduced approximately in proportion to a square of a distance from the center axis hereof.

Another object of the present invention is to provide a somatic microscope or bore-scope which is composed of an extremely narrow outer tube capable of stereoscopically observing such a narrow part direct viewing of which is very difficult as an internal part of the human body.

Another object of the present invention is to provide a novel needle-like microscope for medical observation, which comprises an optical-image transmitting fibrous transparent structure whose refractive index is reduced approximately in proportion to a square of the distance from the center axis thereof and an optical fibrous bundle which transmits the illumination light for illuminating an article to be observed, said structure and bundle being contained for instance in a cavity portion inside of an elongated narrow hollow needle such as an injection syringe for implantation.

Further object of the present invention is to provide a small bendable microscope having a small object lens which is useful for facilitating observation of an object such as an object of high irregularity or the inside portion of a hole, observation of said object being very difficult in the case a conventional microscope.

Further object of the present invention is to provide a microscope capable of facilitating observation of each part of an object without changing a position of the object and a position of eyes.

In case the somatic microscope of the present invention is used, a patient feels only minor pains even when the microscope is inserted into the patient, because the diameter of the tubular structure is narrow, and the tubular structure has flexibility because of the narrow tube and can take a curved position which enables the viewer to observe the object easily. Furthermore, the present invention has large effects such that an affected part can be stereoscopically observed which makes it possible to know precisely the depth of the wound of the affected part or the condition of the irregularities, and function of observation of the affected part is drastically increased. Since the fiber itself has lens function having self-converging property, there is no necessity of using, in combination, an object lens system at an end portion of the device as in the case of the conventional type, so that the device according to the invention is simple in the construction and has a stability in its mechanism which is not affected by the mechanical impact.

The foregoing object and other objects as well as the characteristic features of the invention will become more apparent and more readily understandable by the following description when read in conjunction with the accompanying drawings.

BRIEF DESCRIPTION OF THE DRAWING

FIG. 1 is a schematic plan view showing an optical system of a conventional stereoscopic microscope;

FIGS. 2 and 3 are enlarged cross sectional views of an essential portion showing an embodiment of the present invention;

FIG. 4 is a schematic view showing the principle of the other embodiment of the present invention;

FIG. 7, FIG. 10 (A) and FIG. 10 (B) are descriptive views for explaining the lens function of a fibrous transparent structure to be used in the embodiment of the present invention;

FIG. 8 is a sectional view of a needle-like microscope for medical observation embodying the present invention;

FIG. 9 is a view showing the relationship between an article and an image in the needle-like microscope for medical observation.

DETAILED DESCRIPTION OF THE INVENTION

Figure 5:
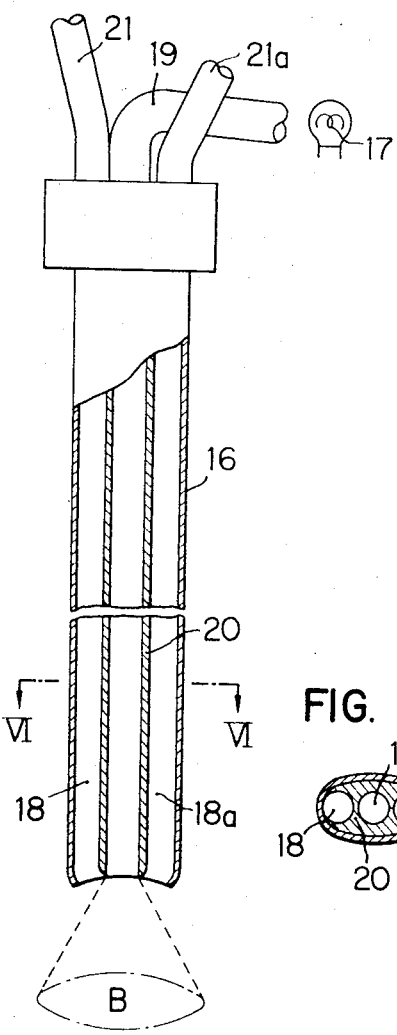
FIG. 5 is a partially cut out side view of a somatic microscope showing another embodiment of the present invention.

A glass fiber having lens function whose refractive index is gradually reduced toward an outer circumference from the center axis of the fiber has a function of transmitting a picture with one fiber, and is capable of replacing the conventional fiber bundle, and therefore the conventional somatic microscope can be made with an extremely narrow outer tube.

The glass fiber having the above-mentioned refractive index distribution can transmit an image to the other end of the fiber even if it is used in curved form, because incident light from one end of the glass fiber is transmitted through the fiber.

The refractive index of the transparent structure which is reduced approximately in proportion to the square of the distance from the center axis thereof can be represented by an equation $n = n_0(1 - 2r^2/b^2)$, wherein $n_0$ is the refractive index at the center axis, $r$ is the distance from the center axis, $b$ is a constant representing the degree of variation of the refractive index. Furthermore, a focal distance of the transparent structure having the above-mentioned refractive index distribution is given by an equation $$f = \frac{b}{2n_0 \sin\left(\frac{2L}{b}\right)}$$

wherein the length in the axial direction is $L$. Regarding this equation, it is clear from a dissertation on an analysis as to a medium having the above-said refractive index distribution of Mr. H. Kogelnik which was described on pp. 455 to 494 of March Issue of 1965 of Bell System Technical Journal, a U.S. technical magazine. In the foregoing equation, if $L=\pi b/4$, the focal distance becomes a minimum value of $f_{min}=b/2n_o$. When the refractive index $n_o$ at the center axis is taken as $n_o=1.6$ and $b$ is put as $b=1$ mm, a minimum focal distance $f_{min}$ becomes approximately 0.3 mm, and thus an object lens for microscope having high magnification can be obtained which has hitherto been difficult to obtain. Furthermore, as it is clear from the equation giving the focal distance, $f$ is a period function of $L$, so that even if the length $L$ is adjusted in terms of a unit of $\pi b$, no change in the optical property is encountered. Accordingly, it is possible to obtain a lengthy converging optical system having a short focal point without having spherical aberration. In this type of the converging optical system, even when two object lenses of the conventional stereoscopic microscope can be substituted, the operating principle remains the same, so that when said lens structures are made narrower and are approached to each other, a stereoscopic microscope having a short focal distance and a high magnification can be obtained and furthermore, if the lens structures are prolonged to provide the flexibility thereof, it becomes possible to observe any part the observation of which has been difficult so far.

Referring now to the accompanying drawings, the embodiments of the present invention are described.

EXAMPLE 1

A glass fiber whose refractive index is reduced in proportion to a square of a distance from the center axis thereof can be easily made in an extremely narrow form having a diameter less than 2 mm. Accordingly, when this glass fiber is cut to a suitable length perpendicular to the center axis, a lens structure whose length is short and having an extremely small diameter (hereinafter referred to as a mini-lens) can be obtained.

FIG. 2 shows an object lens which is an essential part of the present invention, but in the drawing, numerals 4 and 4a are mini-lenses, 5 and 5a are prisms or mirrors, 6, 7, 6a, and 7a are auxiliary lenses, and 8 and 8a are body-tubes. The mini-lenses 4 and 4a mounted on mounting holes provided on the bodytubes 8 and 8a are fixed so that their opening angle ($\theta$) of the optical axis becomes 12°. The prisms or mirrors 5 and 5a mounted in the vicinity of the mini-lenses 4 and 4a lead the light passing through the mini-lens 4 and 4a to the auxiliary lens systems 6, 7, 6a, and 7a and the light is led to the ocular lens.

When a front end lens of the object lens portion is used as the mini-lens, an object to be observed can be viewed stereoscopically with a high magnification by sufficiently causing the object lens to approach the object.

EXAMPLE 2

A rod-like lens structure having a length longer than that of the mini-lens (hereinafter referred to as the rod lens) can be assembled into an object lens system.

In FIG. 3, numerals 9 and 9a are rod lenses, 10, 11, 10a, and 11a are auxiliary lenses, and 12 and 12a denote the bodytubes. The rod lenses are of elongated form having flexibility, and therefore if the tip portions of the two rod lenses 9 and 9a are adjusted and fixed so that the opening angle ($\theta$) of the optical axes becomes 12°, the remaining portion is freely bent and can be led to the auxiliary lens systems.

In the stereo-microscope of the present invention, an image can be led to the right and left eye positions by using a lens system of the conventional stereo-microscope, as it is, except an objective lens system.

EXAMPLE 3

When only the tip portions of the two long rod lenses are adjusted and fixed so that their optical axes intersect at a suitable opening angle without fixing the whole rod lens to the bodytubes of the object lens system, and the other portion is arranged to be freely movable for the flexibility of the rod lenses irrespective of the transference of the ocular lens systems, the observation of the article can be easily carried out. Namely, without changing positions of the object and the eyes, observation of the surface of an article having relatively large irregularity can be made freely from the direction perpendicular to the surface by moving the object lens.

In FIG. 4, numerals 13 and 13a denote the rod lens structures and tip portions thereof on the object side are fixed with a certain angle $\theta$ so that optical axes of the two rod lenses intersect in the vicinity of the focal point. A transfer mechanism (not shown in the drawing) for moving the fixed tip portions is provided, and the position or the direction of the portion to be observed is adjusted. The other ends of the rod lens structures 13 and 13a are connected to the two ocular lens systems 14 and 15, respectively. The identical portion can be observed simultaneously from different angles by the two rod lens systems 13 and 13a, and a magnified actual image is focused in the vicinity of the focal point of the ocular lens systems 14 and 15, and the magnified real image can be observed as a stereoscopic image with both eyes through the ocular lens systems 14 and 15.

In the conventional stereoscopic microscope, two object lenses cannot be approached to each other beyond a certain limit, because the object lens is too large, thus limiting the magnification of the device. On the contrary, in the stereoscopic microscope of the present invention, the observation of the interior in a small hole can be easily attained, because the object lens is sufficiently narrow, and furthermore the microscope of this invention has a flexibility, so that it is possible to observe freely the surface of an article having large irregularity from the direction perpendicular to the surface of the article. The performance of the latter is remarkably useful when taking into consideration the case where the depth of a focus cannot be large in case the magnification is particularly high. If the observation point is changed by adjusting the position of the tip portions of the rod lens structures 13 and 13a, it is clear that each part of an article can be observed without moving positions of the article and the eyes.

It is desirable to cover the surface of the rod lens structures with an opaque substance in order to assure that the incidence of any surplus light is avoided in the light path between the tip portions of the rod lens structures 13 and 13a and the ocular lens systems 14 and 15.

EXAMPLE 4

Figure 6:
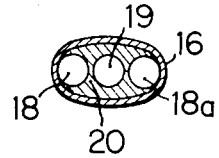
FIG. 6 is a view in section taken in the plane VI—VI of FIG. 5.

FIG. 5 and 6 show one example of the somatic microscope according to the present invention.

Glass fibers 18 and 18a (hereinafter referred to as glass fiber having self-focusing) whose refractive index is reduced approximately in proportion to a square of a distance from the center axis are inserted in a tubular structure 16 in lieu of the conventional glass fiber bundle. A light guide 19 which leads the light from a light source 17 for illuminating the part to be observed is disposed in the tubular structure 16 along the glass fibers. A filling material is filled in a gap 20 between the tubular structure 16 and the contained structure, whereby the contents are fixed. The light guide 19 illuminates the essential part to be observed by transmitting the light from the light source 17. The light guide 19 may be composed of a bundle formed from several glass fibers, one end face of said guide being led to the light source 17, or the guide light for illumination can be taken from circumference of the glass fibers 18 and 18a having self-focusing property by arranging illuminating light conductors at the positions surrounding said glass fibers, instead of illumination from only the center portion as shown in the drawing. As in the case of the somatic microscope, it is necessary to provide an illuminating means for making the observation on a dark portion, but in the case of observing a bright object, the illuminating means is not necessarily required. The illuminated essential part (B) can be viewed simultaneously from different angles by the tips of the glass fibers 18 and 18a having self-focusing property which are disposed at spaced positions.

The image is transmitted through the glass fibers 18 and 18a and is led to the end portions 21 and 21a, and furthermore said end portions are combined with the other lens system in order to lead the magnified image to both right and left eyes.

The somatic microscope of the present invention does not require multiple glass fibers for the transmission of a picture and said microscope can be constructed with a minimum two pieces of glass fibers having self-focusing property, so that an extremely fine tubular device can be obtained.

The present invention has made it possible to provide a stereoscopic microscope having a function which has not been found in the conventional stereoscopic microscope by utilizing mini-lens, rod lens or fiber structures whose refractive index is reduced in proportion to the square of the distance from the center of the axis, and it is sufficient to manufacture the stereoscopic microscope with the use of a minimum of two lens structures. Of course, in the case of the foregoing somatic microscope, when a plurality of glass fibers having self-focusing property are bundled in one system by making them as one integral unit and another system which is composed of a plurality of the same glass fibers as described above is provided, these two systems are inserted in a tubular structure, and they are arranged in such a way that an identical object is simultaneously observed from different angles, it is possible that the images of the respective systems are led to the right and left eyes for stereoscopic observation and this is within the spirit of the present invention.

As a material for this transparent structure whose refractive index distribution in cross section perpendicular to the center axis is reduced approximately in proportion to the square of the distance from the center of the axis, glass, synthetic resin are suitable for use and particularly in the case of glass, as described in the U.S. patent application Ser. No. 806,368 filed Mar. 12, 1969, it is possible to provide a desired refractive index distribution by gradually changing the refractive index in the inside of the glass by varying the concentration of cation forming modifying oxide of the glass. In the case of the synthetic resin, for instance, it is possible to obtain the transparent structure by changing the refractive index continuously by application of heat after several kinds of the resins which have different refractive indes and are mutually diffusible at a high temperature are coated on a core resin.

The fibrous transparent structure having the foregoing refractive index distribution has the lens function which is identical with that of the combination of several convex lenses. As shown in FIG. 7, light in a transparent structure 22 travels around the center axis $m-ma$ while oscillating in the form of a sine wave whose inherent wavelength S is $\pi b$. The light from an article P focuses an image Q after passing the inside of the transparent structure 22. In FIG. 8, construction of a needle-like microscope for medical observation is illustrated. The numeral 23 denotes, for instance, a hollow needle having an inner diameter of 1.5 mm, and inside thereof is provided with fibrous glass 24 having the foregoing refractive index and an optical fiber bundle 25 surrounding the glass fibers 24. The numeral 26 denotes a front glass panel provided at the tip of the needle 23, 27 is an ocular lens and 28 is a light source for illumination of the article. The light from the light source 28 passes through the optical fibrous bundle 25 and is projected out of the tip 29 of said bundle 25, whereby the article outside of the front glass panel 26 is illuminated.

The light from the article P as shown in FIG. 9 passes through the inside of the fibrous glass 24 and focuses an image Q in the vicinity of the end face 30. The magnified virtual image Qa is observed by the ocular lens 27.

The fibrous glass is for instance manufactured in the following manner; a glass rod having 1 mm diameter with a composition of $SiO_2$ 56 weight percent, $Na_2O$ 14 weight percent, $Tl_2O$ 20 weight percent, PbO 10 weight percent is formed, and this glass rod is immersed in a potassium nitrate bath containing thallium nitrate for 24 hours at a temperature of 500° C, whereby a glass rod, in which the refractive index $n_o$ in the center is 1.56, the refractive index of the surface is 1.53, and the distribution of the refractive index $n$ of the inside is $n=n_o(1-ar_2)$, wherein $a=7.7$ cm$^{-2}$, is obtained. This glass rod is cut and both ends thereof are ground so as to be perpendicular to the center axis. The length of the glass rod is determined by the length of the hollow needle of the needle-like microscope for medical observation and by the desired focal distance thereof.

Figure 10A:
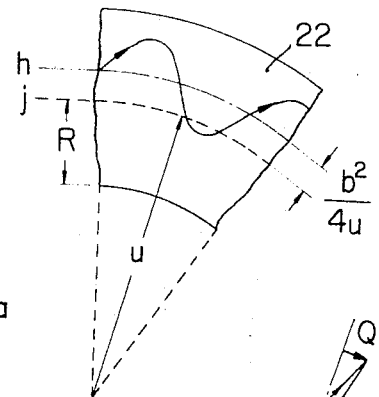
Figure 10B:
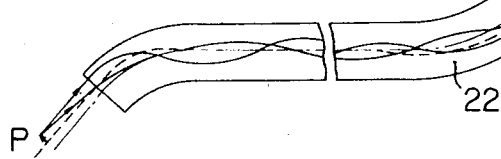

When the center axis of the transparent substance is curved in part, the optical axis being the oscillation center of the progressing light is not in agreement with the center axis at the curved portion. If a certain part of the center axis is curved with a curvature radius of $u$, the optical axis at that part is deviated outwardly from the center axis by $b^2/4u$. As is shown in FIG. 10 (A) the optical axis $h$ is shifted from the center axis $j$ at the curved portion of the transparent substance 22.

Therefore, when $b^2/4u$ is sufficiently small as compared with a radius R of the transparent substance, the light beams wander, as shown by arrow, around the optical axis, whereby an image is transmitted. The brightness of the image is reduces when $b^2/4u$ becomes larger, because the quantity of light colliding with the side surfaces of the transparent substance is increased. Accordingly, if the transparent substance is previously curved or even if the transparent substance is flexible and curved temporarily, the curvature does not exceeds a certain limit, the relationship between the object and image is kept unchanged so far as the curvature does not exceeds a certain limit and the image transmission by the transparent substance is carried out. Of course, the optical axis at the curved portion is deviated from the center axis. This state is shown in FIG. 10 (B), where the dotted line represents the optical axis deviated from the center axis and an image of the object P is transmitted through the interior of the fibrous transparent substance 22 to form a real image Q.

According to the present invention, a microscope comprising a transparent structure (hereinafter referred to a self-focusing optical fiber) having flexibility, the refractive index of said structure being reduced approximately in proportion to the square of the radial distance from the center axis and an ocular lens can be obtained.

The embodiment of the present invention is described in the following.

Figure 11:
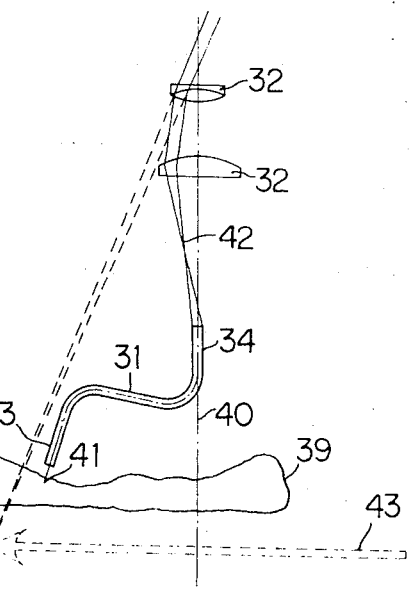
FIG. 11 is a view for explaining the microscope in another embodiment of the present invention.

In FIG. 11, a self-focusing optical fiber 31 and a Kellner type ocular lens 32 are provided. The self-focusing fiber 31 has the refractive index distribution as mentioned above and according to development of the manufacturing technique, it has become possible to obtain a fiber having a diameter of approximately 0.2 mm and a value of $b$ of approximately above 0.1 mm. Accordingly, as described in the foregoing, it is possible to make the focal distance approximately 30 microns, and the fiber having a longer focal distance can be arbitrarily obtained by varying length or value of $b$. The end 33 of the self-focusing optical fiber 31 is fixed to a transfer mechanism which is not shown in the drawing, and by this mechanism, the part 41 to be observed in the article 39 to be observed can be adjusted so that said part 41 faces perpendicularly on this axis in the extended line of the center axis of the one end 33 of the optical fiber 31 and is brought in nearly the position of the focal point. The other end 34 of the optical fiber 31 is fixed so that the center axis of said end 34 coincides with the optical axis 40 of the ocular lens 32 and the magnified real image 42 due to the optical fiber 31 of the part 41 to be observed is brought in the vicinity of the focal point of the ocular lens 32. According to this arrangement, the observer can observe the magnified virtual image 43 of the real image 42 through the ocular lens 32, and the observation can be made with sufficient magnification of the part 41 to be observed. Since the glass fiber 31 is sufficiently narrow and fine, the observation of the inside of a small hole can be easily made by inserting it into said hole, and also the observation can be easily made from the direction perpendicular to the surface of an article having large irregularity, because said fiber has a flexibility. The performance of the latter is remarkably advantageous when the depth of a focus cannot be large in case the high magnification is particularly required. When the observing point is changed by adjusting position of the one end 33 of the optical fiber 31, it is clear that the observation of each part of the article can be made without moving positions of the article and the eyes. It is desirable to cover the fiber with an opaque substance in order to avoid incidence of the surplus light from the circumference of the light path between the one end 33 of the optical fiber 31 and the ocular lens 32.

In the above example, it is required that the self-focusing optical fiber 31 is of a flexible transparent structure having the refractive index distribution as mentioned already, and the material is not to be limited to glass, and plastic may be used, and the ocular lens 32 is not limited to Kellner type ocular lens, because the ocular lens is employed for viewing the real image 42 in a magnifying state.

We claim:

1. A stereoscopic microscope comprising two ocular lenses spaced from one another to accommodate a viewer's eyes and two transparent fiber structures constituting objective lenses and image transmitting passages, upper ends of said fiber structures having flat end faces optically aligned with said ocular lenses, and intermediate portions of said fiber structures being curved in toward one another so that lower end portions are close together, said lower end portions having flat faces directed toward an object to be viewed without objective lenses between said lower end faces and said object, each said fiber structure having a refractive index distribution in which the refractive index is greatest at the center axis of said structure and decreases toward the periphery substantially in proportion to the square of the distance from the center axis and substantially satisfying the equation $n = n_o(1 - ar^2)$ where $n_o$ represents the refractive index at the center axis, $n$ represents the refractive index at a radial distance $r$ from said central axis and $a$ is a positive constant, said fiber structures transmitting images of said object through said curved portions to said ocular lenses.

2. A stereoscopic microscope as claimed in claim 1, wherein the lower ends of said fiber structures directed toward the object to be viewed are arranged so that the extension lines of said center axes cross at an angle of 12°.

3. A stereoscopic microscope as claimed in claim 1, wherein said transparent fiber structures are flexible and said lower end portions are movable relative to said upper ends to adjust the position of said lower end portions and the direction in which they are directed.

4. A stereoscopic microscope as claimed in claim 1, wherein said fiber structures have a diameter less than 2 mm.

5. A stereoscopic microscope as claimed in claim 1, wherein the surfaces of said transparent fiber structures are coated with opaque material.

* * * * *